Jan. 20, 1931.  DE FOREST ROE  1,789,391
LINOLEUM TRUCK
Filed May 27, 1927  2 Sheets-Sheet 1

Inventor
De Forest Roe
By Frank M. Slough
His Attorney

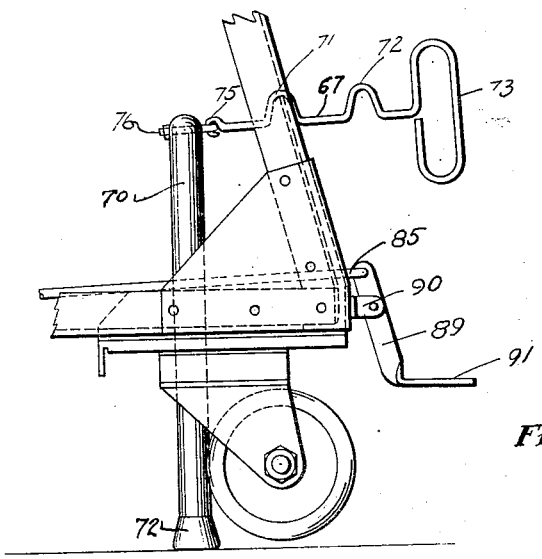
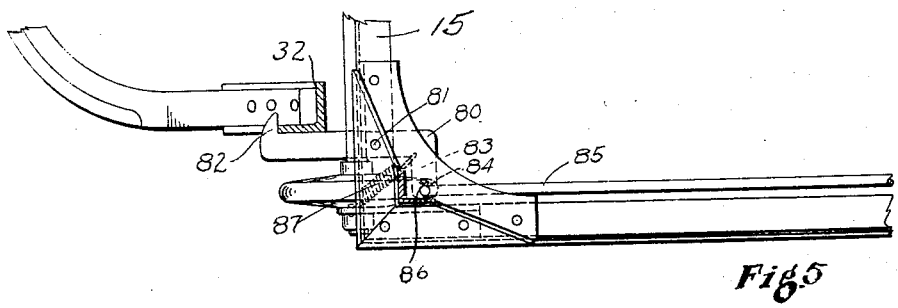
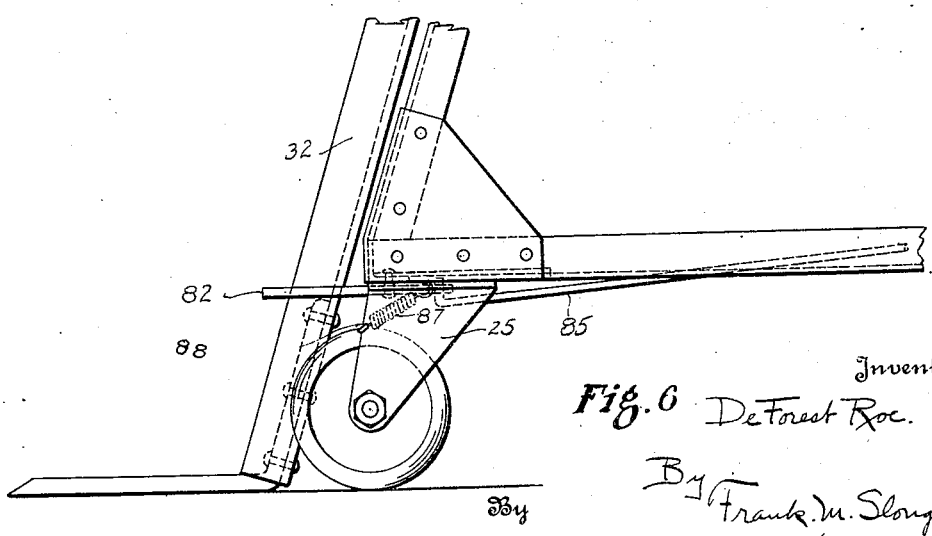

Patented Jan. 20, 1931

1,789,391

UNITED STATES PATENT OFFICE

DE FOREST ROE, OF ELYRIA, OHIO, ASSIGNOR TO THE COLSON COMPANY, OF ELYRIA, OHIO, A CORPORATION OF OHIO

LINOLEUM TRUCK

Application filed May 27, 1927. Serial No. 194,827.

My invention relates to an improved wheeled hand truck and relates particularly to a truck adapted for handling rolled sheet material such as heavy rolls of linoleum, oil-cloth, and the like.

An object of my invention is to provide an improved truck for use in moving heavy rolls of linoleum, oil-cloth, and the like, about a store-room, with minimum effort on the part of an operator in absolute safety, lessening the possibility of injury to either operator or the material moved.

Another object of my invention is to provide an improved truck of the class referred to wherein provision is made for expeditiously loading and unloading the roll of material onto or off of the truck, and wherein provision is made for maintaining the truck in stationary position during the loading or unloading operations.

Another object of my invention resides in the provision of a truck of the rolled sheet material handling type which is durable in construction, capable of withstanding heavy weights and rough usage to which this type of truck is usually subjected, and which is easy and simple to operate.

These and other objects of my invention and the invention itself will become apparent from reference to the following description of an embodiment thereof and in which description reference will be had to the accompanying drawings forming a part of this specification.

Referring to the drawings.

Figure 2:
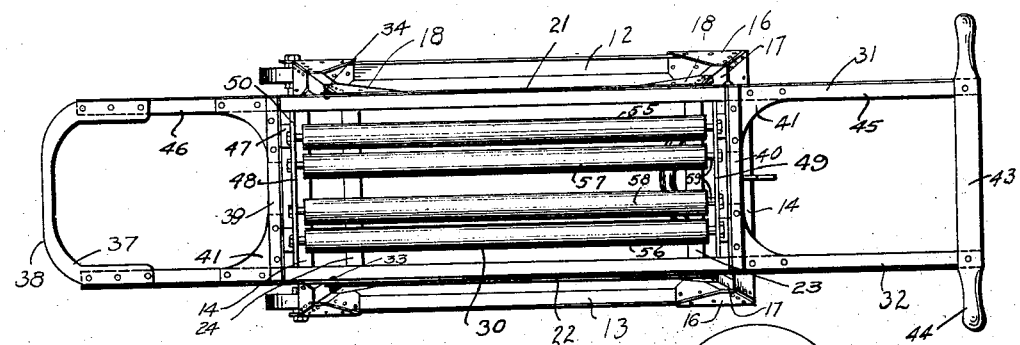
Fig. 2 is a top plan view thereof.

Fig. 4 is a fragmentary side elevational view of a truck elevating mechanism forming a part of my invention, some of the parts shown in section, and enlarged over the parts shown in the foregoing figures; and Figs. 5 and 6 are a fragmentary side elevational view and a fragmentary top plan view, respectively, of a trip mechanism for a tiltable platform which I may employ, some of the parts being shown in section.

Referring to all of the figures of drawing, in all of which like parts are designated by like reference characters, at 10, I show a main skeleton frame preferably comprising a base portion 11, including a plurality of side and end angle irons 12 and 13, and 14 and 15, respectively, secured together at their ends by riveting the same to corner brackets 16. A plurality of vertically disposed angle iron posts 17 are riveted to the brackets 16, and are tilted inwardly towards each other away from the brackets. Preferably riveted to the upper ends of the posts 17 are corner brackets 18, similar to the brackets 16, adapted to support a top portion 20 of the truck frame. The top portion 20 is preferably smaller than the base portion but is constructed similar thereto, having side and end angle irons 21 and 22, and 23 and 24, respectively, riveted to the corner brackets 18. The side, top and end angle irons are all parallel to each other and the frame 10 is generally pyramidal in contour, to lower the center of gravity thereof to facilitate better balance of the truck and to prevent upsetting of the truck by virtue of heavy loads carried thereon.

A plurality of caster yokes 25 and anti-frictional caster wheels 26, preferably four in number, are carried in the corner brackets 16 for supporting the frame, the rear pair being swivelably mounted in the brackets to permit the truck to be wheeled from place to place and steered and turned in a relatively small area with a minimum effort on the part of an operator in handling a roll of heavy sheet material.

A tiltable superstructure or platform 30 is preferably pivoted on a pair of pins 33 and 34 journaled in a pair of apertures one of which is shown at 36 in the projecting ends of the side angle irons 21 and 22 of the frame top portion 20. The lateral portions of the projecting side angle irons are cut away adjacent the pins 33 and 34 to facilitate rocking of the platform into a tiltable position relative to the frame when it is desired to either load a roll of material 100, such as linoleum, thereon, or to unload the same therefrom. Said platform preferably comprises a pair of elongated side angle irons 31 and 32 disposed on a horizontal plane, and a cross rail or nose piece 37 having a knife edge 38, which connects the side angle irons together at one end. Said knife edge 38 facilitates the nose piece to be readily disposed under the supporting end of a standing roll of sheet material so that the same may be mounted on the platform for handling. Also the platform is provided with transversely disposed angle irons 39 and 40 riveted to sheet metal brackets 41, which brackets are in turn riveted to the side members 32 intermediate their ends. A push handle 43 having laterally disposed hand grip portions 44 is secured to the ends of the side angle irons 31 and 32 at the end opposite the nose piece. Said platform is of a length greater than the frame and the portions 45 and 46 overhanging the frame at each end are adapted to provide for relatively long rolls of sheet material and to facilitate ready handling thereof by virtue of the long leverage of the platform. The push handle 43 is so disposed relative to the truck frame that an operator may walk behind the truck, in pushing the same, with ample room to permit him to take full steps.

Preferably bolted to the transverse angle irons 39 and 40 and spaced therefrom by inserts 47, are a pair of parallel upright cradle plates 48 and 49. Laterally projecting ends 50 are adapted to further support the upright plates. Said plates are each provided with a plurality of aligned apertures, preferably four in number, arranged so that two pairs 51 and 52 are disposed relatively close to each other to provide a cradle and on a plane below that of the plane of the other more spaced pairs 53 and 54 so that rolls of material of varying diameters may be mounted on upper and lower pairs of elongated rollers 55 and 56, and 57 and 58, respectively, having projecting shafts 59 journaled in the apertures. A roll having a diameter substantial to that shown at 100, or greater than the same, may be mounted on the upper pairs of rolls, while a roll, as shown at 101, of less diameter than that of the roll 100, may be mounted on the lower rolls 57 and 58.

Figure 3:
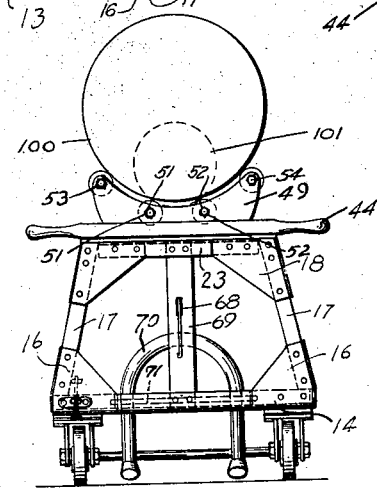
Fig. 3 is an end elevational view of the embodiment of Figs. 1 and 2.
Figure 1:
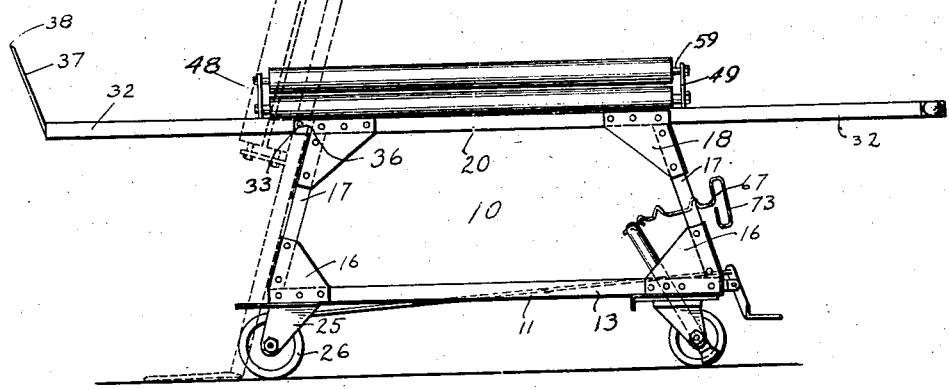
Fig. 1 is a side elevational view of an embodiment of my invention illustrating in dotted lines, and in one of its operative positions a tiltable platform which I may employ.

Referring to Figs. 3 and 4 of the drawings, I show a mechanism for the truck adapted to maintain the truck in stationary position while the roll of sheet material is either being loaded or rolled onto the truck or while it is being removed or unrolled therefrom for displaying the material or for cutting the same. Said mechanism preferably comprises an inverted U-shaped rocker arm 70 pivoted on a rock shaft 71 carried in the side angle irons of the base portion of the truck frame. Arm 70 is so pivoted on the shaft 71 that depending end portions of the arm are of a length greater than the height of the shaft 71. Rubber foot pads 72 are telescoped over the ends of the arms 70 and are adapted to overcome any tendency of the arm to slip when contacted with the floor, or other supporting surface, and to prevent the same from damage to the floor. An operating rod 67 for the elevating mechanism is provided and projects through a slot 68 in an upstanding post 69, which post is preferably riveted to the top and base end frame members. The operating rod is looped at 73 to provide a handle grip portion to permit the rod to be reciprocated in the slot 68 to rock the arm 70. The opposite end of the rod is also looped at 75, which loop is connected to an eyebolt 76 bolted on to the arm 70 adjacent its topmost portion to provide a connection between the rod and the arm. Intermediate the ends of the rod are spaced bent portions 71 and 72 adapted to provide hooks which may be hooked over the bottom edge of the slot 68 to retain the arm 70 in either of its operative positions. By virtue of the arrangement above described, when the arm 70 is rocked on its pivot the pads will engage the floor and elevate one end of the truck frame and the caster wheels out of contact with the floor.

As best shown in Figs. 5 and 6, and preferably mounted on the base portion of the frame adjacent the platform pivot, is disposed a trip mechanism adapted to hold the platform in tilted position when the same has been tilted to load a roll of sheet material thereon or when unloading a sheet of material therefrom. Said mechanism preferably comprises a trip or latch lever 80 pivoted at 81 to the base portion of the frame and having a hooked end 82 adapted to snap over the edge of the side angle iron 32. The opposite end of the lever is bent at right angles at 83, and is apertured at 84 into which the end of an operating rod 85 is connected, and which is held from accidental displacement therefrom by a cotter pin 86. One end of a coil spring 87 is secured to the lever in an aperture adjacent the bent portion of the lever, and the opposite end of the spring is anchored in an aperture 88 in the caster yoke 25. Said spring is adapted to normally hold the trip lever 80 in the position shown in Figs. 5 and 6 wherein the platform is tilted and wherein the hook end of the trip lever engages the edge of the side angle iron 32 and will prevent the platform from returning to normal horizontal position, until the trip lever is released by a pull on the rod 85. Said rod 85 extends longitudinally of the base portion of the frame to the end thereof adjacent the elevating mechanism heretofore described, and is pivoted to a foot lever 89, which foot lever is pivoted on a bracket 90 carried on the base portion of the frame. A foot platform 91 extends from the foot lever and may be pressed by the foot of an operator to release the trip lever so that the platform may be swung into normal horizontal position on the frame.

Said superstructure or platform is retained in its normal horizontal position on the truck by virtue of its balance due to the position of its pivotal connection with the frame and by virtue of its own weight. When a load is placed on the platform it will further tend to return the platform to normal horizontal position when the trip lever has been released.

Having thus described my invention in a specific embodiment, I am aware that numerous and extensive departures may be made from the embodiment herein illustrated and described without departing from the spirit of my invention.

I claim:

1. A truck, comprising a frame having a base and a top supported thereon, forward and rear rollers movably supporting the base, a platform adapted to be supported in a substantially horizontal position on the top and terminating at one end in a lift portion and at the other end in a handle, said lift portion extending forwardly of the top, said handle extending rearwardly thereof, means pivotally supporting the platform on the top adjacent a forward edge thereof whereby said platform may be rotated to a more vertical position with the handle uppermost and the lift portion disposed adjacent to and forward of the base, and common operable controllable means disposed at the rear of the base adapted to usurp the supporting function of the rear rollers and to fixedly support the truck independently thereof, to prevent movement of the truck.

2. A truck, comprising a frame having a base and a top supported thereon, forward and rear rollers movably supporting the base, a platform adapted to be supported in a substantially horizontal position on the top and terminating at one end in a lift portion and at the other end in a handle, said lift portion extending forwardly of the top, said handle extending rearwardly thereof, means pivotally supporting the platform on the top adjacent a forward edge thereof whereby said platform may be rotated to a more vertical position with the handle uppermost and the lift portion disposed adjacent to and forward of the base, and common operable controllable means disposed at the rear of the base adapted to usurp the supporting function of the rear rollers and to fixedly support the truck independently thereof, to prevent movement of the truck, comprising a pair of legs joined together at their upper ends swivelably secured to the base intermediate their ends, an operator operable controlling means for rotating the legs on their pivots and stops to prevent rotation of the legs beyond a predetermined position beyond vertical position.

3. In a truck mechanism of the class described, the combination of a mobile frame having a relatively elevated top, an article handling platform having a handle at a rear end and an article lifting tip at its opposite end angularly disposed thereto, said platform being adapted to rest in superposed relation horizontally upon said top and to be of such length as to effect forward projection of said tip and rearward projection of said handle beyond the front and rear of said top, pivot means associated with said top and said platform adapted to permit rotation of the platform about the forward edge of the top, said frame comprising a forwardly disposed top supporting portion inclined rearwardly toward the top and adapted for engagement by the forwardly projecting end of the platform when rotated toward the vertical position, and to form a stop therefor, and manually releasable means to latch the platform to the frame to retain it in such position of rotation as to place it in parallel relation to said inclined portion of the frame.

4. In a mobile truck, the combination with a frame comprising a top and a base, and a frame element supporting the top on the base, of a platform pivotally supported by the top adjacent a forward edge thereof, and adapted to be supported in an approximately horizontal position on the top, said platform having a lift portion projecting forwardly of the point of pivotal support for the platform and rotatively movable to a pendent substantially verticle position, said lift portion comprising an article engaging tongue, disposed horizontally when the lift is pendently disposed, stop means comprising portions of the frame of the truck engageable with an intermediate pendent portion of said platform when disposed pendently to prevent further rotative movement of the platform, latching means to retain the platform in said relatively verticle position and operator actuatable means disposed in the rear of the frame adapted when operated to disengage said latching means, said platform being provided with a handle for its end remote from said lift portion, and said handle being adapted when the platform is in horizontal position to project beyond the rear of said frame.

5. In a mobile truck, the combination with a frame comprising a top and a base, and a frame element supporting the top on the base, of a platform pivotally supported by the top adjacent a forward edge thereof, and adapted to be supported in an approximately horizontal position on the top, said platform having a lift portion projecting forwardly of the point of pivotal support for the platform and rotatively movable to a pendent substantially vertical position, said lift portion comprising an article engaging tongue, disposed horizontally when the lift is pendently disposed, stop means comprising portions of the frame of the truck engageable with an intermediate pendent portion of said platform when disposed pendently to prevent further rotative movement of the platform, latching means to retain the platform in said relatively vertical position and operator actuatable means on the frame adapted when operated to disengage said latching means, said platform being provided with a handle disposed rearwardly of the pivotal support of the platform.

6. In a mobile truck, the combination with a frame comprising a top and a base, and a frame element supporting the top on the base, of a platform pivotally supported by the top adjacent a forward edge thereof, and adapted to be supported in an approximately horizontal position on the top, said platform having a lift portion projecting forwardly of the point of pivotal support for the platform and rotatively movable to a pendent substantially vertical position, said lift portion comprising an article engaging tongue, disposed horizontally when the lift is pendently disposed, stop means comprising portions of the frame of the truck engageable with an intermediate pendent portion of said platform when disposed pendently to prevent further rotative movement of the platform, latching means to retain the platform in said relatively vertical position and operator actuatable means disposed in the rear of the frame adapted when operated to disengage said latching means.

In testimony whereof I hereunto affix my signature this 24th day of May, 1927.

DE FOREST ROE.